US011301844B2

(12) United States Patent
Collinge et al.

(10) Patent No.: US 11,301,844 B2
(45) Date of Patent: Apr. 12, 2022

(54) CRYPTOGRAPHIC AUTHENTICATION AND TOKENIZED TRANSACTIONS

(71) Applicant: Mastercard International Incorporated, Purchase, NY (US)

(72) Inventors: Mehdi Collinge, Mont-Sainte-Aldegonde (BE); Alan Johnson, Maldon (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 238 days.

(21) Appl. No.: 16/325,084

(22) PCT Filed: Aug. 11, 2017

(86) PCT No.: PCT/US2017/046437
§ 371 (c)(1),
(2) Date: Feb. 12, 2019

(87) PCT Pub. No.: WO2018/031856
PCT Pub. Date: Feb. 15, 2018

(65) Prior Publication Data
US 2020/0302441 A1 Sep. 24, 2020

(30) Foreign Application Priority Data

Aug. 12, 2016 (GB) ..................................... 1613882

(51) Int. Cl.
*G06Q 20/38* (2012.01)
*G06Q 20/36* (2012.01)
(Continued)

(52) U.S. Cl.
CPC ... *G06Q 20/38215* (2013.01); *G06Q 20/3674* (2013.01); *G06Q 20/3829* (2013.01);
(Continued)

(58) Field of Classification Search
CPC ......... G06Q 20/38215; G06Q 20/3674; G06Q 20/3829; G06Q 20/4014; G06Q 2220/00;
(Continued)

(56) References Cited

U.S. PATENT DOCUMENTS 10,373,138 B2    8/2019  Hammad
10,515,358 B2 *  12/2019 Nagasundaram .. G06Q 20/3821
(Continued)

FOREIGN PATENT DOCUMENTS

JP    2003303310 A    10/2003
JP    2010218440 A     9/2010
(Continued)

OTHER PUBLICATIONS

Office Action Issued in Russian Application No. 2019106658/08(12882), dated Feb. 14, 2020, 14 Pages.
(Continued)

*Primary Examiner* — Jacob C. Coppola
(74) *Attorney, Agent, or Firm* — Talem IP Law, LLP

(57) ABSTRACT

A cryptographic method of performing a tokenised transaction between a payment offering party and a payment accepting party is described. The tokenised transaction is mediated by a transaction scheme. The payment accepting party is provided with a merchant identity and a merchant certificate associated with that identity by the transaction scheme provider. The payment accepting party provides the merchant identity and transaction seed data to the payment offering party. The payment offering party validates the merchant identity and uses the merchant identity and the transaction seed data to generate a cryptogram for the tokenised transaction. The payment offering party provides the cryptogram to the payment accepting party for transmission to the transaction scheme provider for authorisation of the tokenised transaction. A suitable user computing device (Continued)

and merchant computing device for acting as payment offering party and payment accepting party respectively are also described.

13 Claims, 11 Drawing Sheets

(51) Int. Cl.
*G06Q 20/40* (2012.01)
*H04L 9/08* (2006.01)

(52) U.S. Cl.
CPC ....... *G06Q 20/4014* (2013.01); *H04L 9/0869* (2013.01); *G06Q 2220/00* (2013.01); *H04L 2209/56* (2013.01)

(58) Field of Classification Search
CPC ...... G06Q 20/32; G06Q 20/382; G06Q 20/20; G06Q 20/12; H04L 9/0869; H04L 2209/56
See application file for complete search history.

(56) References Cited

U.S. PATENT DOCUMENTS

| | | | | |
|---|---|---|---|---|
| 10,671,993 | B2* | 6/2020 | Bailey | G06Q 20/3224 |
| 2002/0073045 | A1* | 6/2002 | Rubin | G06Q 20/367 |
| | | | | 705/65 |
| 2002/0164031 | A1 | 11/2002 | Piikivi | |
| 2006/0111125 | A1* | 5/2006 | Karaoguz | H04W 12/06 |
| | | | | 455/456.2 |
| 2008/0150678 | A1* | 6/2008 | Giobbi | G07F 17/32 |
| | | | | 340/5.2 |
| 2008/0243703 | A1 | 10/2008 | Al-Herz et al. | |
| 2011/0178925 | A1 | 7/2011 | Lindelsee et al. | |
| 2012/0226582 | A1* | 9/2012 | Hammad | H04L 9/3234 |
| | | | | 705/26.41 |
| 2014/0289129 | A1* | 9/2014 | Savolainen | G06Q 20/20 |
| | | | | 705/67 |
| 2014/0289821 | A1* | 9/2014 | Wilson | G07F 19/20 |
| | | | | 726/5 |
| 2015/0010149 | A1 | 1/2015 | Roberts et al. | |
| 2015/0046338 | A1 | 2/2015 | Laxminarayanan et al. | |
| 2015/0052064 | A1 | 2/2015 | Karpenko et al. | |
| 2015/0073995 | A1 | 3/2015 | Hayhow et al. | |
| 2015/0088756 | A1* | 3/2015 | Makhotin | G06Q 20/3829 |
| | | | | 705/71 |
| 2015/0095238 | A1 | 4/2015 | Khan et al. | |
| 2015/0149365 | A1* | 5/2015 | Mobini | G06Q 20/382 |
| | | | | 705/75 |
| 2016/0012441 | A1* | 1/2016 | Goldberg | G06Q 20/401 |
| | | | | 705/44 |
| 2018/0268408 | A1* | 9/2018 | Botros | G06Q 20/405 |

FOREIGN PATENT DOCUMENTS

| | | | | |
|---|---|---|---|---|
| RU | 2580086 C2 | 4/2016 | | |
| WO | 2001048648 A | 7/2001 | | |
| WO | WO-2012021864 A2 * | 2/2012 | ............ | G06Q 20/351 |
| WO | WO-2016099468 A1 * | 6/2016 | ............ | G06Q 20/24 |

OTHER PUBLICATIONS

Notice of Rejection Issued in Patent Application No. 2019-507205, dated Feb. 4, 2020, 10 Pages.
PCT International Search Report from PCT Application No. PCT/US2017/046437 entitled Cryptographic Authentication and Tokenized Transactions (dated Oct. 17, 2017).
Office Action issued in Canadian Application No. 3033654, dated Jan. 18, 2021, 6 Pages.
Office Action issued in European Application No. 17754988.8, dated Oct. 26, 2020, 9 Pages.

* cited by examiner

CRYPTOGRAPHIC AUTHENTICATION AND TOKENIZED TRANSACTIONS

CROSS-REFERENCE TO RELATED APPLICATION

This is a National Phase Application pursuant to 35 U.S.C. § 371 of International Application No. PCT/US2017/046437, filed Aug. 11, 2017, claiming priority of United Kingdom Application No. 1613882.8 filed Aug. 12, 2016, each of which is hereby incorporated in its entirety by reference herein.

FIELD OF DISCLOSURE

The present disclosure relates to cryptographic authentication and tokenized transactions. In embodiments, the disclosure relates to authentication mechanisms and data flows using these mechanisms to provide additional functionality in tokenized transactions.

BACKGROUND OF DISCLOSURE

Payment cards such as credit cards and debit cards are very widely used for all forms of financial transaction. The use of payment cards has evolved significantly with technological developments over recent years. Originally, transactions were on paper, using an imprint of a transaction card and confirmed by a signature. This approach was largely replaced by use of a magnetic stripe of a transaction card swiped through a magnetic stripe reader on a point of sale (POS) terminal to perform a transaction. Transaction cards developed to contain an integrated circuit ("chip cards" or "smart cards") that communicates with a smart card reader in the POS terminal. Using this approach, a transaction is typically confirmed by a personal identification number (PIN) entered by the card user. Cards of this type typically operate under the EMV standard for interoperation of chip cards and associated apparatus (such as POS terminals and ATMs). ISO/IEC 7816 provides a standard for operation of cards of this type. Payment cards and devices are provided under a transaction scheme (such as MasterCard, American Express or Visa) and the transaction mechanism is mediated by the transaction scheme infrastructure.

EMV specifications relate to contact and contactless payment protocols and are publicly available at the EMVCo website (EMVCo is the industry body tasked with maintaining these specifications with the support of major transaction scheme providers)—https://www.emvco.com/document-search/—and would readily be consulted by the person skilled in the art. Terminology relating to EMV technology not expressly defined in this document is referenced and defined in EMV specifications, as will be appreciated by the person skilled in the art.

Technology has further developed to provide payment cards which operate contactlessly—under EMV, these are covered under the ISO/IEC 14443 standard. Using such cards, the primary account number (PAN) can be read automatically from the card by a POS terminal using NFC protocols—this approach is generally referred to as "contactless" or "proximity" payment. This is typically enabled by embedding of an NFC chip in a card body together with a suitable antenna to allow transmission and receipt of wireless signals—the transmissions may be powered by a magnetic inductive field emitted by a proximity reader in the POS terminal. For an effective transaction to be made; the payment card may need to be brought into close proximity to the proximity reader—EMVCo has defined this range under the Level 1 operating volume range of 0-4 cm.

It is now also possible to use a computing device such as a consumer mobile device as a proxy for a payment card—typically this will be a user smartphone running a mobile payment application and with access to user credentials. Such a mobile payment application will typically be securely provisioned to a consumer mobile device (hereafter "mobile phone") to act as a proxy for a payment card using NFC technology standards, which are built in to the majority of current mobile phones. Using such an application, the user can conduct 'tapping based' transactions against a proximity reader, as well as perform account management operations over an appropriate network interface (cellular, local wireless network) in an online banking interface with the user's account provider. A user may now commonly use his or her mobile phone in obtaining banking services.

In performing digital transactions using a computing device, a preferred approach is tokenisation. This involves the replacement in the transaction of a card's primary account number (PAN—this number is associated with the cardholder's account with an issuing bank) with an alternate card number, or token. Tokenisation is typically used for point-of-sale transactions with mobile devices, in-app purchases or online purchases. To support tokenisation, card details are held in a digital wallet on a cardholder's device supported by a wallet provider. The transaction scheme provides a digital enablement service to support tokens, and tokens are managed by a token service provider. Payment protocols are provided which allow transactions to be performed according to EMV specifications using tokens rather than a card PAN. While other payment technologies for mobile use exist, the present applicant uses for tokenisation a payment solution called DSRP (Digital Secure Remote Payment) in support of the Mobile PayPass mobile payment application, with digital enablement in the transaction scheme infrastructure provided by the Mastercard Digital Enablement Service (MDES).

Tokenisation provides benefits to customers and merchants by reducing fraud as it allows for the use of EMV supported cryptographic processes. It would however be desirable to develop further the tokenisation approach to provide additional benefits in transaction control for merchants and customers.

SUMMARY OF DISCLOSURE

In a first aspect, the disclosure provides a cryptographic method of performing a tokenised transaction between a payment offering party and a payment accepting party mediated by a transaction scheme, wherein the payment accepting party has been provided with a merchant identity and a merchant certificate associated with that identity by the transaction scheme provider, the method comprising: the payment accepting party providing the merchant identity and transaction seed data to the payment offering party; the payment offering party validating the merchant identity and using the merchant identity and the transaction seed data to generate a cryptogram for the tokenised transaction; and the payment offering party providing the cryptogram to the payment accepting party for transmission to the transaction scheme provider for authorisation of the tokenised transaction.

This approach allows additional functionality to be provided in performance of the transaction. Using such a mechanism to enable trust in the merchant allows the merchant to add to the functionality of the transaction and to allow the transaction to be customised to merchant requirements without loss of security.

In embodiments, the transaction seed data is protected by a key associated with the merchant certificate, and the merchant certificate is provided by the payment accepting party to the payment offering party. In such a case, the merchant certificate may define one or more features of the transaction process at the payment offering party. These one or more features may comprise a customer verification method.

The transaction seed data may comprise an unpredictable number.

In embodiments, the payment offering party provides issuer authentication status information to the payment accepting party to indicate whether a token for the tokenised transaction has been authenticated by an issuer associated with the payment offering party's account. In this case, the payment offering party may provide the issuer authentication status information in a message rather than in transaction data.

In embodiments, a token associated with the tokenised transaction is locked for use only for a transaction with the payment accepting party. This provides a significant additional security benefit for all parties associated with the transaction. In such a case, the transaction scheme provider may determine whether the token is locked for use only with a transaction with the payment accepting party and uses this determination in providing transaction authorisation.

In a second aspect, the disclosure provides a user computing device, comprising a processor and a memory, wherein the processor is adapted to run a wallet application and a mobile payment application stored in the memory, wherein the user computing device is adapted through the wallet application and the mobile payment application to perform steps performed by the payment offering party in the method set out above.

In a third aspect, the disclosure provides a merchant computing device, comprising a processor and a memory and adapted to perform as a merchant point of sale terminal for performing transactions associated with a transaction scheme, wherein the merchant computing device is adapted to perform steps performed by the payment accepting party in the method set out above.

BRIEF DESCRIPTION OF FIGURES

Embodiments of the disclosure will now be described, by way of example, with reference to the accompanying figures, of which.

DESCRIPTION OF SPECIFIC EMBODIMENTS

General and specific embodiments of the disclosure will be described below with reference to the figures.

Figure 1:
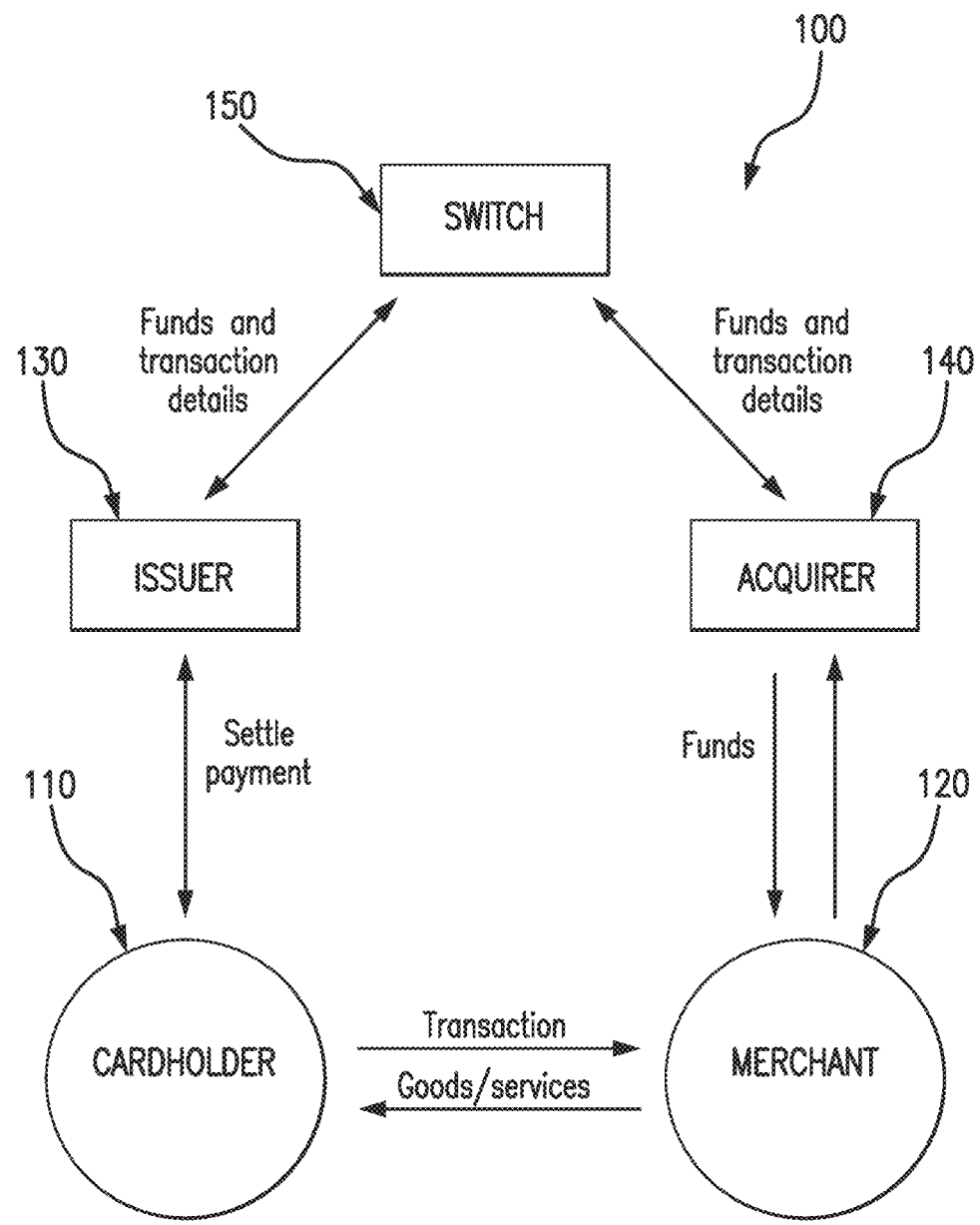
FIG. 1 shows schematically a transaction system using the four-party model.

FIG. 1 is a block diagram of a typical four-party model or four-party payment transaction scheme. The diagram illustrates the entities present in the model and the interactions occurring between entities operating in a card scheme.

Normally, card schemes—payment networks linked to payment cards—are based on one of two models: a three-party model or a four-party model (adopted by the present applicant). For the purposes of this document, the four-party model is described in further detail below.

The four-party model may be used as a basis for the transaction network. For each transaction, the model comprises four entity types: cardholder 110, merchant 120, issuer 130 and acquirer 140. In this model, the cardholder 110 purchases goods or services from the merchant 120. The issuer 130 is the bank or any other financial institution that issued the card to the cardholder 110. The acquirer 140 provides services for card processing to the merchant 120.

The model also comprises a central switch 150—interactions between the issuer 130 and the acquirer 140 are routed via the switch 150. The switch 150 enables a merchant 120 associated with one particular bank acquirer 140 to accept payment transactions from a cardholder 110 associated with a different bank issuer 130.

A typical transaction between the entities in the four-party model can be divided into two main stages: authorisation and settlement. The cardholder 110 initiates a purchase of a good or service from the merchant 120 using their card. Details of the card and the transaction are sent to the issuer 130 via the acquirer 140 and the switch 150 to authorise the transaction. Should the transaction be considered abnormal by the issuer 130, the cardholder 110 may be required to undergo an additional verification process to verify their identity and the details of the transaction. Once the additional verification process is complete the transaction is authorised.

On completion of the transaction between the cardholder 110 and the merchant 120, the transaction details are submitted by the merchant 120 to the acquirer 140 for settlement.

The transaction details are then routed to the relevant issuer 130 by the acquirer 140 via the switch 150. Upon receipt of these transaction details, the issuer 130 provides the settlement funds to the switch 150, which in turn forwards these funds to the merchant 120 via the acquirer 140.

Separately, the issuer 130 and the cardholder 110 settle the payment amount between them. In return, a service fee is paid to the acquirer 140 by the merchant 120 for each transaction, and an interchange fee is paid to the issuer 130 by the acquirer 140 in return for the settlement of funds.

In practical implementations of a four-party system model, the roles of a specific party may involve multiple elements acting together. This is typically the case in implementations that have developed beyond a contact-based interaction between a customer card and a merchant terminal to digital implementations using proxy or virtual cards on user computing devices such as a smart phone.

Figure 2:
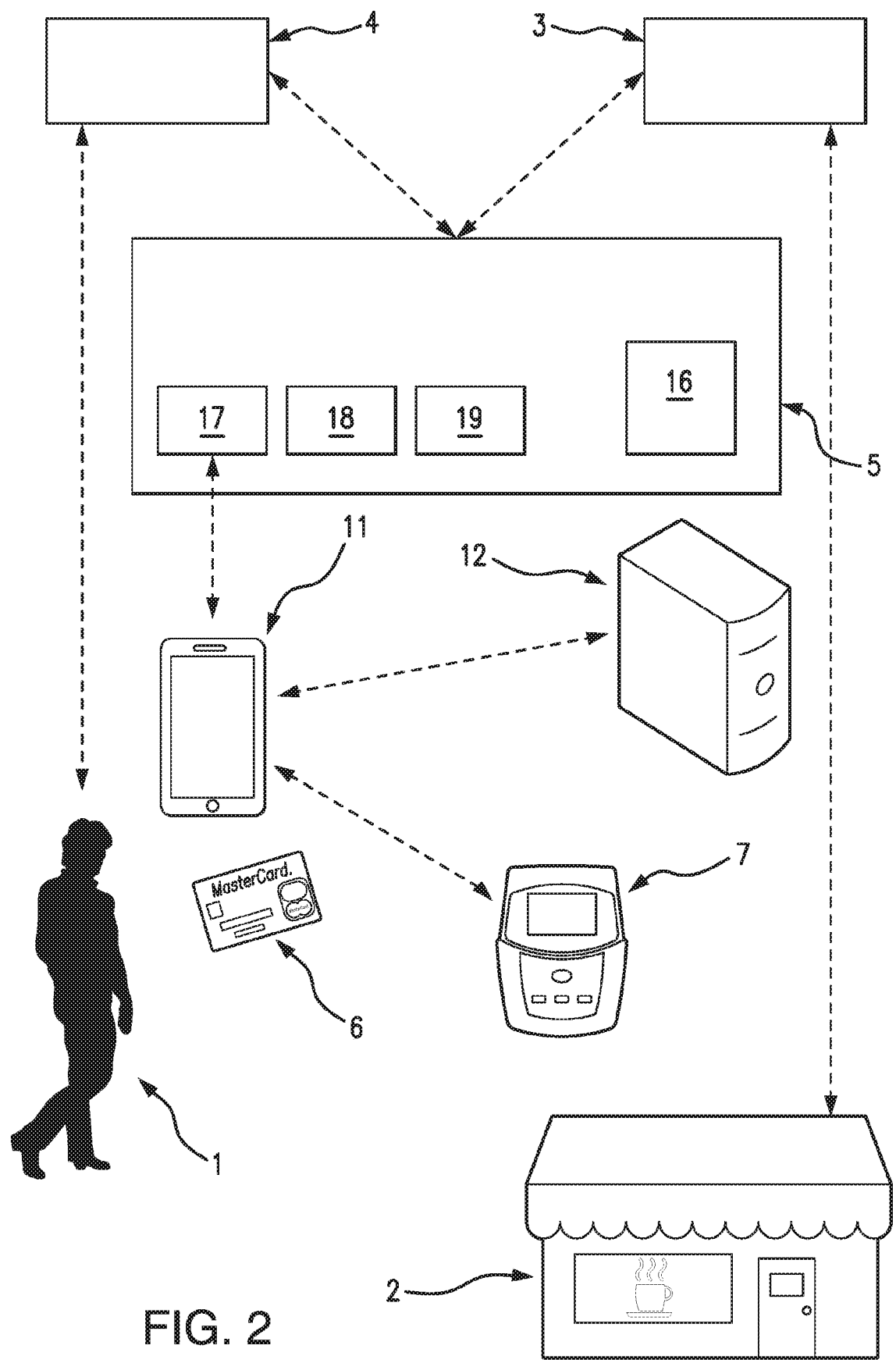
FIG. 2 shows an implementation of the transaction system of FIG. 1 adapted for performing embodiments of the disclosure.

FIG. 2 shows an architecture according to an embodiment of the disclosure appropriate for interaction between a user computing device and a merchant point of sale (POS) terminal.

The cardholder 1 uses their computing device—which may be any or all of a cellular telephone handset, a tablet, a laptop, a static personal computer or any other suitable computing device (here a cellular telephone handset or smartphone 11 is shown)—to act either as a proxy for a physical payment card 6 or as a virtual payment card operating only in a digital domain. The smartphone 11 achieves this with a mobile payment application and a digital wallet, as described below. The smart phone 11 is thus able to transact with a merchant POS terminal 7 using NFC or another contactless technology. The smartphone 11 may also be able to interact with a merchant server 12 representing the merchant 2 over any appropriate network connection, such as the public internet.

The transaction scheme infrastructure (transaction infrastructure) 5 provides not only the computing infrastructure necessary to operate the card scheme and provide routing of transactions and other messaging to parties such as the acquirer 3 and the issuer 4, but also a wallet service 17 to support a digital wallet on the cardholder computing device, and an internet gateway 18 to accept internet based transactions for processing by the transaction infrastructure. In other embodiments, the wallet service 17 may be provided similarly by a third party with an appropriate trust relationship with the transaction scheme provider. To support tokenisation, a token service provider 19 is present (again, this is shown as part of transaction infrastructure 5 but may be provided by a third party with appropriate trust relationships), and the transaction scheme infrastructure provides a digital enablement service 16 to support the performance of tokenised digital transactions, and to interact with other elements of the system to allow transactions to be performed correctly.

For a tokenised transaction, the transaction is validated in the transaction scheme by mapping the cardholder token to their card PAN, checking the status of the token (to ensure that it is in date and otherwise valid) and any customer verification approach used. This allows the issuer to authorise the transaction in the normal manner.

Figure 3A:
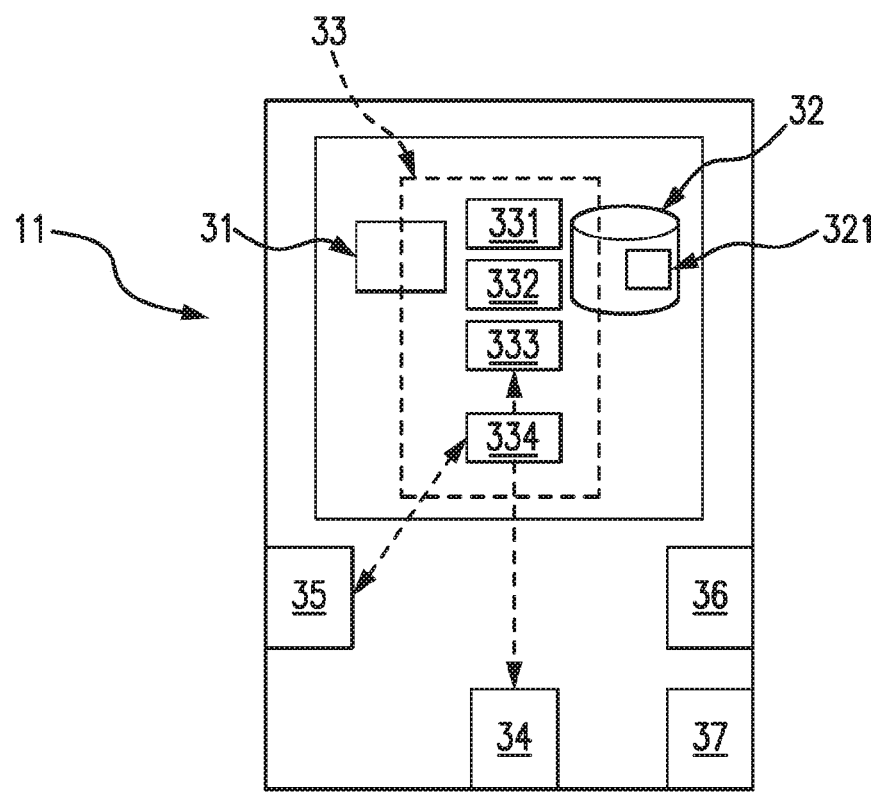
FIGS. 3A and 3B show, respectively, functional elements of a user computing device and a merchant device for use in the transaction system implementation of FIG. 2.
Figure 3B:
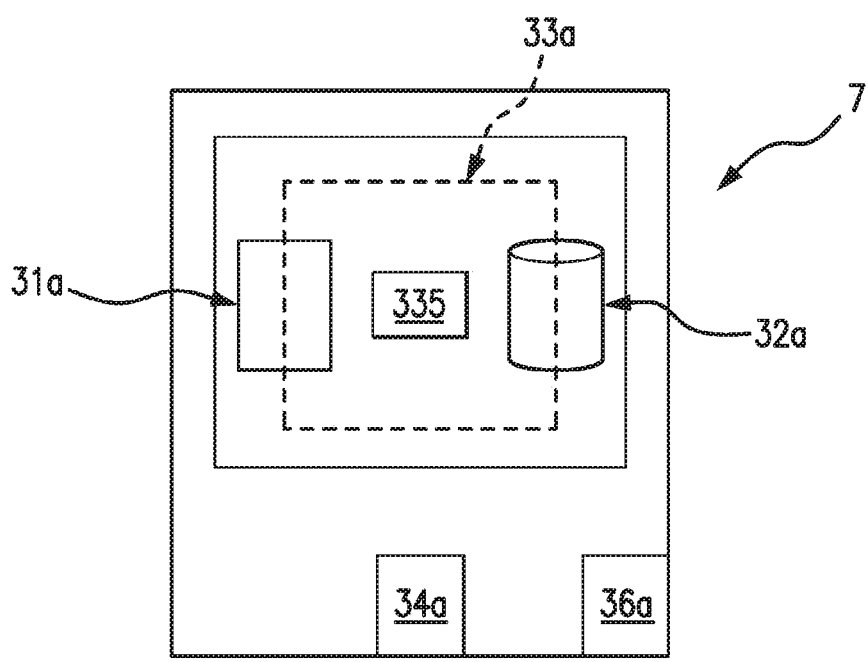

FIGS. 3A and 3B illustrate schematically by function a user computing device and a merchant POS device respectively. Other elements of the architecture of FIG. 2 are either not modified in embodiments of the disclosure, or are organised in an essentially conventional manner—for example merchant server 12, which may be implemented by an industry standard server programmed to have a conventional server/client relationship with clients such as a merchant application on a user's smartphone. Similarly, the elements shown explicitly within the transaction scheme, which may be carried out by suitably programmed servers associated with the transaction scheme. Generally, the transaction scheme infrastructure 5 comprises servers, network communications and switches to allow transactions to be correctly routed and processed.

FIG. 3A shows a user computing device, in this case a smartphone 11. The smartphone possesses at least one processor 31 and at least one memory 32, between them defining a computing environment 33 for performance of applications. Applications running in the computing environment include a wallet application 331, a merchant application 332 and a proximity payment system environment 333, which are described in further detail below. Other elements may be present such as a biometric application 334 which may be used to authenticate the user 1 of the smartphone 11 before an action is taken. The memory 32 may contain one or more physically or logically protected regions 321 for protection of sensitive data required by these applications—such secure environments may be implemented in a variety of ways (as the skilled person will appreciate) and are not shown explicitly here, but access to secure data handling will typically be required by both a wallet application and a biometric application. The smartphone 11 is of course adapted for cellular communication (and generally also short range wireless communication) and has a wireless communication system 34. The smartphone 11 also here has a biometric sensor, in this case fingerprint reader 35. Other conventional elements of a smartphone device such as a touchscreen user interface 36 and a camera 37 are present but where their operation is conventional they are not described explicitly here.

FIG. 3B shows a POS terminal 7 adapted to implement an embodiment of the disclosure—in this case, the POS terminal 7 is shown as a mobile device, but in other embodiments it may be a static computing device. The POS terminal 7 also possesses at least one processor 31a and at least one memory 32a, between them defining a computing environment 33a for performance of applications. The applications here include a point of sale (POS) application 335 using a communications interface 34a for communication with the user smartphone 11 and a user interface 36a (other communication options may also be provided, such as typically a connection to other networked devices within the wider network architecture). Features of the POS application 335 will be described further below—as noted further below, this includes discussion of features that may be carried out on the merchant POS device but may also be carried out in another merchant system such as the merchant server.

Figure 4:
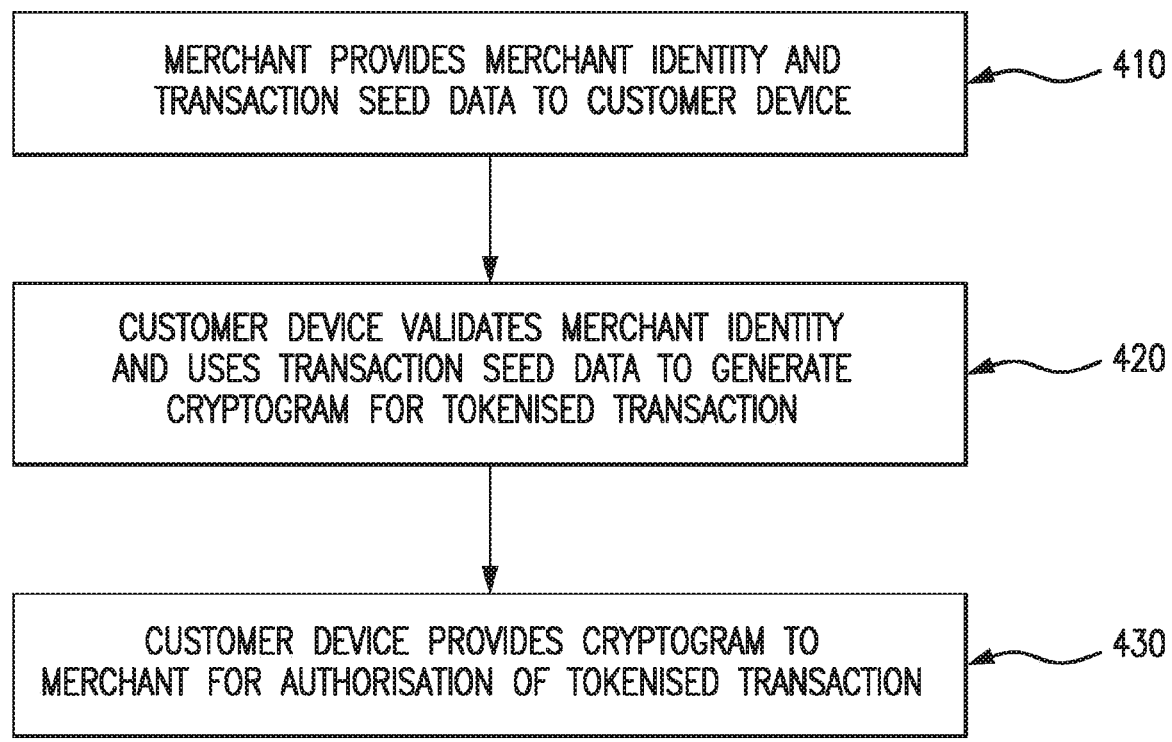
FIG. 4 shows in an embodiment of a method of the disclosure.

A general embodiment of a method according to the disclosure is illustrated schematically in FIG. 4. FIG. 4 sets out steps in performance of a tokenised transaction according to embodiments of the disclosure. In this approach, the payment accepting party (the merchant) has been provided with a merchant identity and a merchant certificate associated with that identity by the transaction scheme provider. For the tokenised transaction, the merchant provides 410 the merchant identity and transaction seed data to the payment offering party (the customer, as represented by the customer computing device comprising a mobile payment application and a wallet application). The customer device validates 420 the merchant identity and using the merchant identity and the transaction seed data to generate a cryptogram for the tokenised transaction. This cryptogram may be generated (as an Application Cryptogram) in accordance with EMV specifications, with data relating to the functionality of the disclosure provided in data fields within existing EMV data fields purposed or repurposed accordingly. The customer device then provides 430 the cryptogram to the merchant for transmission to the transaction scheme provider for authorisation of the tokenised transaction.

Figure 5:
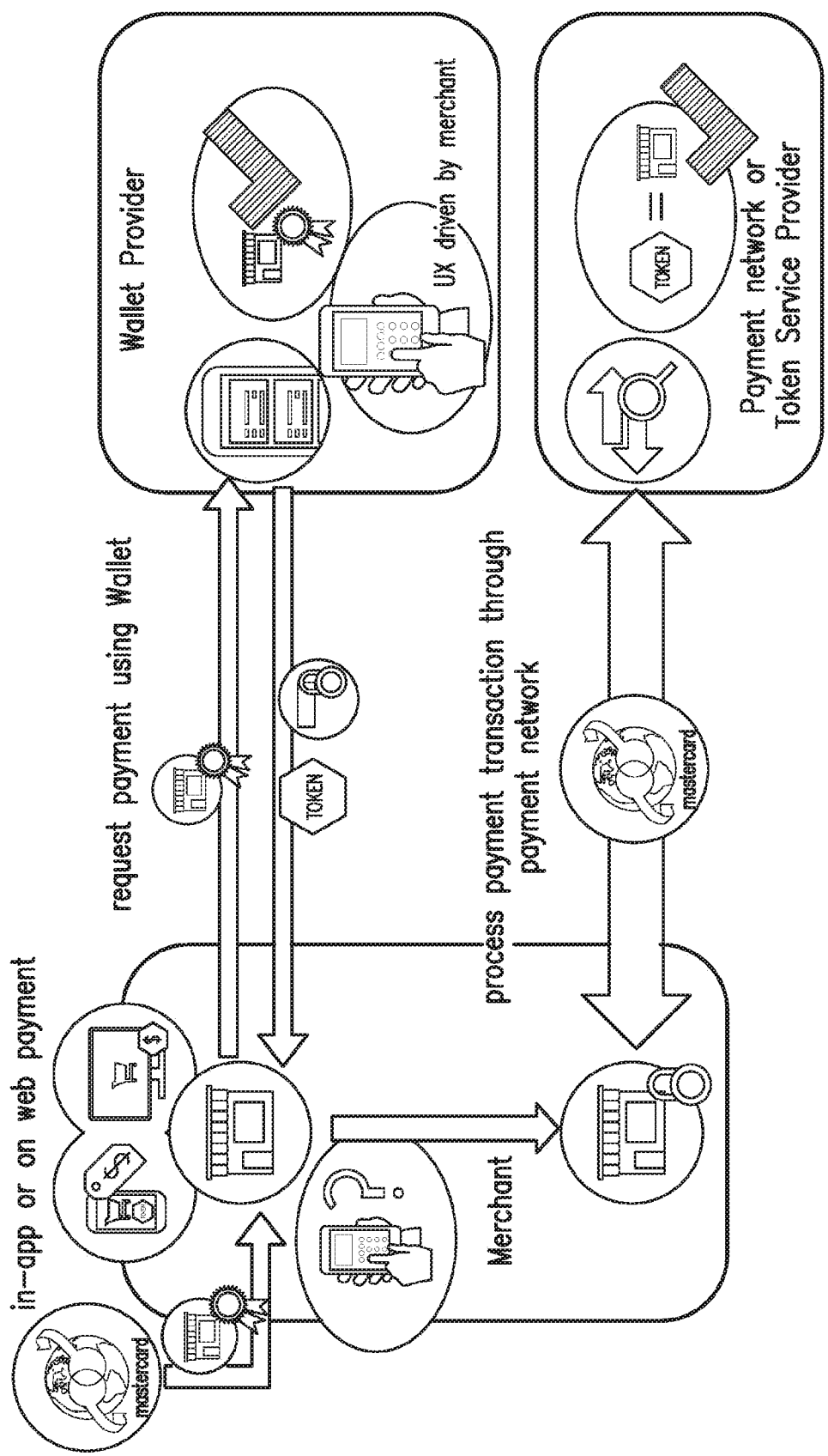
FIG. 5 illustrates schematically functionality provided by embodiments of the disclosure.

FIG. 5 illustrates schematically functionality provided by embodiments of the disclosure. FIG. 5 generally shows a system for merchants performing electronic commerce transactions using tokens provided by a digital wallet provider, and illustrates enhancement to conventional tokenised transactions. Enhancements presented are in four areas:

Wallet providers are able to identify whether a merchant is legitimately permitted to use a payment token held by the wallet provider that has been created by a payment network (or a token service provider).

This allows wallet providers to restrict the capabilities of their wallet to only permitted uses. For example, requesting a consumer verification such as entry of a PIN or passcode, the wallet generating a transaction cryptogram could be limited to only legitimate merchants.

Merchants may indicate their preferred user experience for wallet transactions.

This allows, for example, for a merchant to indicate it does not wish for a consumer verification to be performed and is willing to accept the risk associated if the transaction was later found out to be fraudulent.

Merchants can receive and verify transactional information from the wallet.

This allows merchants to provide an optimized user experience.

For example, the wallet could inform the merchant whether a consumer verification was performed, and whether the consumer verification involved the card issuer and therefore the transaction may benefit from a liability shift from merchant to issuer. If a consumer verification was not performed, the merchant may choose to additionally perform a cardholder authentication process such as SecureCode after receiving the token transaction data from the wallet.

The payment network (or the token service provider) can if desired lock the use of a specific token within a wallet to a specific merchant.

This further improves the security of payment tokens by ensuing that possible data breaches involving the theft of tokens held by merchants may not be submitted by a fraudulent merchant to perform transactions.

Implementations of aspects of the disclosure are described in respect of the present applicant's Digital Secure Remote Payment (DSRP) payment solution. This payment solution allows Card Not Present merchants to benefit from the dynamic transaction data generated by mobile payment applications using tokenisation. A Card Not Present merchant is a merchant transacting with an entity other than a physical card in such a way that the merchant cannot take assurance from the use of the customer's physical card at a merchant terminal. DSRP is used in association with tokenized cards enabled by the Mastercard Digital Enablement Service (MDES).

Digital Secure Remote Payment transactions contain dynamic data (cryptograms) generated using EMV-based cryptography by a mobile payment application to secure the transaction.

Digital Secure Remote Payment transactions require cardholder authentication, and include dynamic data to provide evidence that cardholder authentication has been performed.

Digital Secure Remote Payment transactions can be initiated from any device that can perform cardholder authentication including mobile devices and properly secured web-based implementations.

These transactions include typical mobile e-commerce scenarios where the cardholder is using either the mobile browser or a specific merchant application to purchase goods and/or services. While aspects of the disclosure are described in relation to embodiments employing DSRP and MDES, they are not limited to these technologies and may be used in embodiments employing tokenised cards enabled by a different enablement service and using a different payment solution.

Five new concepts that can be used to enhance Digital Secure Remote Payment (DSRP) or any similar payment solution when transacting with an authenticated merchant are described below. These are as follows, and are each described in detail below.

Merchant Authentication Process
Authenticated Unpredictable Number Delivery
Channel Locking using an authentication model
Merchant Driven User Experience
Issuer Authentication Status for Merchant A process used to authenticate a merchant and generate a merchant certificate is described. A unique identifier is assigned to an authenticated merchant (in embodiments, this is given the term Mastercard Authenticated Accepter ID, or MAAID). The term merchant is used in the context of a person or organization that can accept a transaction scheme card and then directly or indirectly initiate a transaction.

Authenticated delivery of information can be used to improve the security of the payment solution and may be used further for channel locking—a solution for ensuring a token's use may be limited to a specific merchant's transaction.

The channel locking process uses an authentication model to let:
1. The scheme provider to authenticate the merchant
2. The wallet to authenticate the merchant
3. The authorization system to authenticate the wallet/payment application
4. The wallet to authenticate the consumer The Authorization system is able to check that:
The consumer was verified by the wallet
The transaction was performed using an authenticated merchant authenticated by a wallet/payment application using a genuine token In at least one embodiment, the merchant can drive the user experience of the wallet while delivering information in a secure way between the merchant and the wallet. In this way the merchant can adjust the payment experience of the consumer depending on the type of purchase performed and the availability of a consumer verification process at level of the merchant.

A solution is provided to simplify the integration of Issuer Authenticated transactions with the merchant environment by allowing the merchant to trust an Issuer Authentication Status delivered by the payment application prior to submitting a transaction. This may assist the merchant on whether to invoke an alternate cardholder authentication mechanism, such as SecureCode, if he wishes to benefit from possible fraud liability shift for the transaction.

The solutions described in this document do not require any changes for the Acquirer and the Issuer. There are technological changes defined for the merchant, these are used to improve the security of the payment solution transactions and additionally give the opportunity for liability shift to be granted to authenticated merchants, providing them with a significant practical benefit. The payment application may extend existing processes in order to integrate additional features provided here.

The merchant authentication process is split into two parts: determination that the merchant is a genuine merchant able to accept transaction scheme brands; and generation of a Merchant Certificate to be delivered to the genuine merchant.

Figure 6:
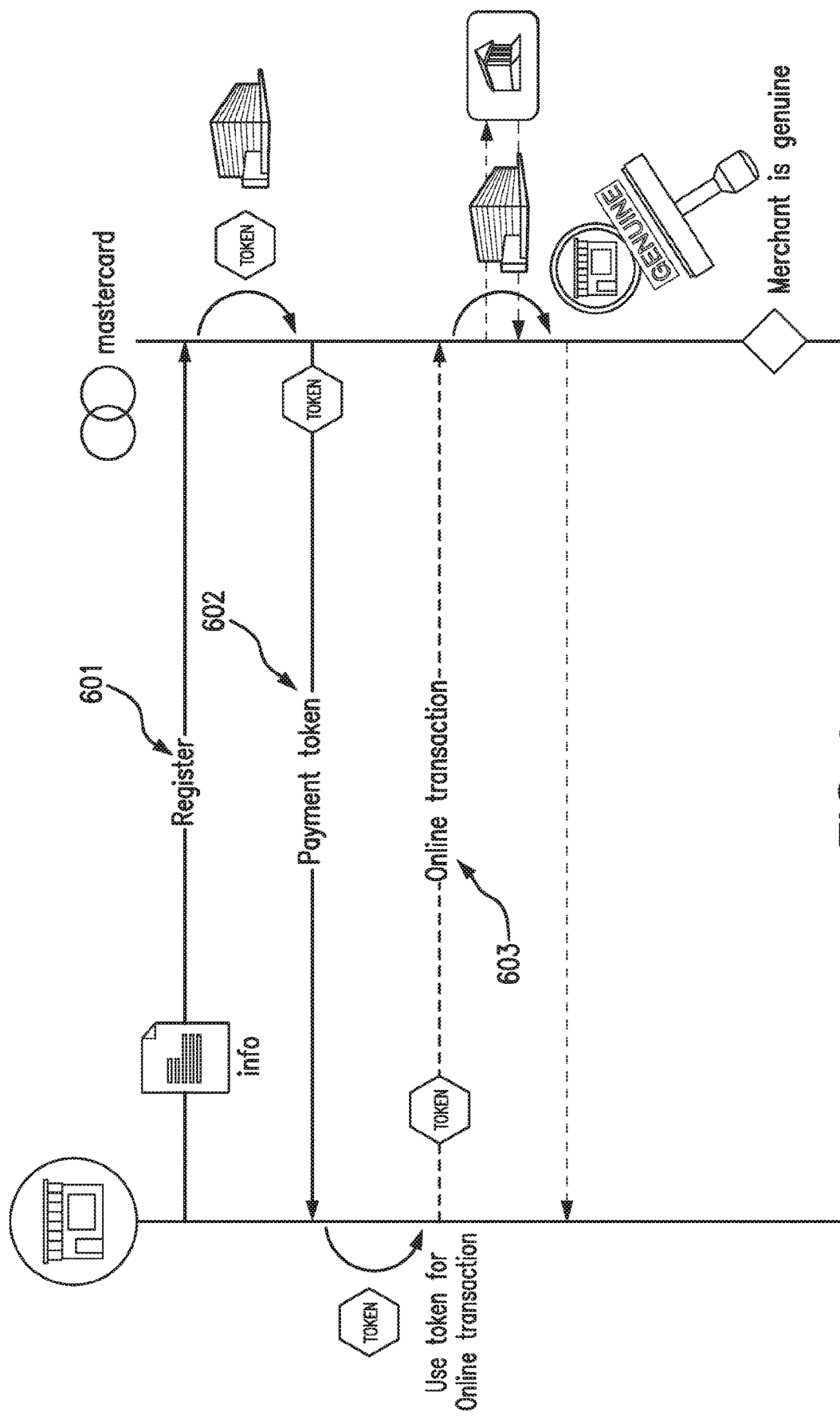
FIG. 6 illustrates a process for determining that a merchant is genuine and eligible to be an authenticated merchant in embodiments of the disclosure.

FIG. 6 illustrates the first part—a process for determining that a merchant is genuine and eligible to be an authenticated merchant. The process used to determine that a merchant is genuine uses a tokenized payment transaction to validate that the merchant (identified using merchant identifier) is able to accept transaction scheme brands.

The steps of the process are as follows:

1. The merchant applies (601) to the transaction scheme to be registered as an Authenticated Merchant.
2. The transaction scheme delivers (602) a payment token to the merchant.
3. The merchant uses (603) the token to perform one online transaction.
4. The transaction scheme online authorization system validates (604) the transaction.

The successful validation of the transaction is used to confirm that the merchant is a genuine merchant eligible to receive a Merchant Certificate. In other embodiments, manual, paper-based or form-based processes may also be used to determine merchant eligibility.

Figure 7:
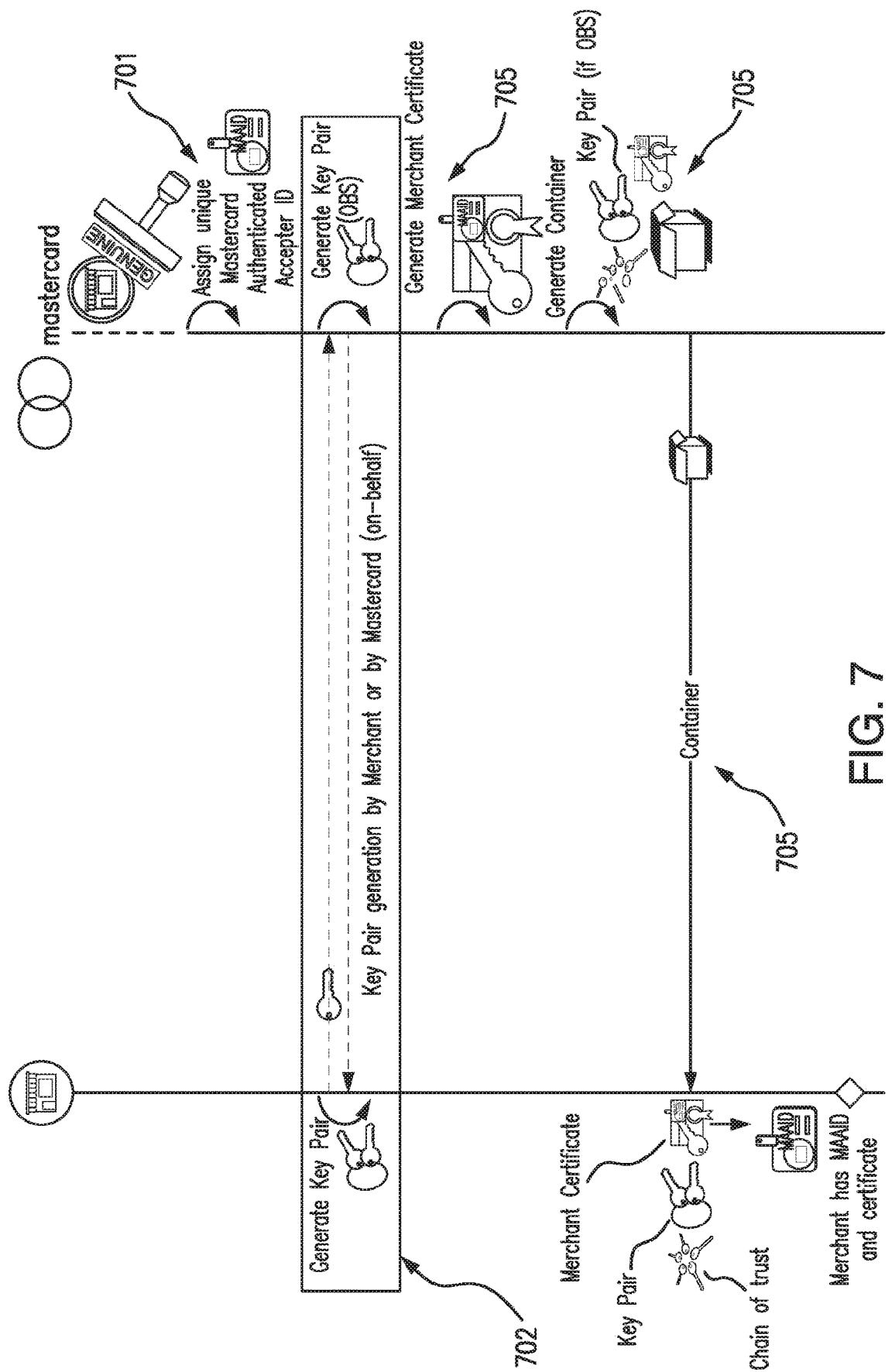
FIG. 7 illustrates a process for managing a merchant key pair and issuance of a merchant certificate in embodiments of the disclosure.

FIG. 7 illustrates the second part of the merchant authentication process—a process for managing a merchant key pair and issuance of a merchant certificate.

A Genuine Merchant is eligible to receive a merchant certificate. The steps of the process are as follows:

1. The transaction scheme assigns (701) a unique identifier (here, a Mastercard Authenticated Accepter ID or MAAID) to the merchant which has successfully completed the Genuine Merchant process.
   The MAAID may be already defined independently of the tokenized transaction performed by the genuine merchant.
   In embodiments, the MAAID is a 16-byte Globally Unique Identifier (GUID) to ensure uniqueness
2. The transaction scheme can assign/define additional fields/data elements that are specific to this merchant. Optionally, the merchant can also contribute to the definition of some data elements.
3. The merchant is provided (702) with a key pair (to enable participation in a public key infrastructure—PKI) using for example one of the following methods:
   The transaction scheme key management services can generate the key pair (PKI) on behalf of the merchant
      The process can be automated in order to avoid any manual process when managing keys and certificates
      The process can be under the control of key management services resources
   The merchant can generate its own key pair.
   The merchant can upload any required information to a transaction scheme portal or any other method can be used to deliver information to transaction scheme key management services. In embodiments, the process uses any appropriate agreed cryptographic method and key type, such as RSA or ECC.
4. The transaction scheme prepares a certificate signing request (CSR) containing all the information to be signed by transaction scheme key management services. In embodiments, the merchant can prepare the certificate signing request (CSR) and deliver it using a transaction scheme provider portal or any other method.
5. Transaction scheme key management services use a Certification Authority to generate (703) the merchant certificate. Note that the merchant certificate must include the MAAID.
6. The transaction scheme then generates (704) a container for the merchant.

If the transaction scheme has generated the key pair on behalf of the merchant then the transaction scheme provider can generate an archive file format (using for example PKCS #12) in order to bundle the generated key pair, the merchant certificate and all the members of a chain of trust.

If the key was generated by the merchant then the transaction scheme can generate a list of certificates (using for example PKCS #7) in order to bundle the merchant certificate and all the members of a chain of trust Note that the transaction scheme can also include additional certificates in the container such as certificate used to validate certificate associated to the token and the issuer of the token (See discussion of Issuer Authentication Status below)

7. The transaction scheme delivers (705) the container to the merchant.
8. The merchant receives the container.
9. The merchant authentication process is completed with the following post-conditions:
   The merchant has a key pair (PKI)
   The merchant has a merchant certificate and the related chain of trust
   The merchant has a chain of trust that can be used to validate a certificate associated to a token (ICC Key Pair and Issuer (TSP) Certificate)
   The merchant has a merchant unique identifier (MAAID).

Figure 8:
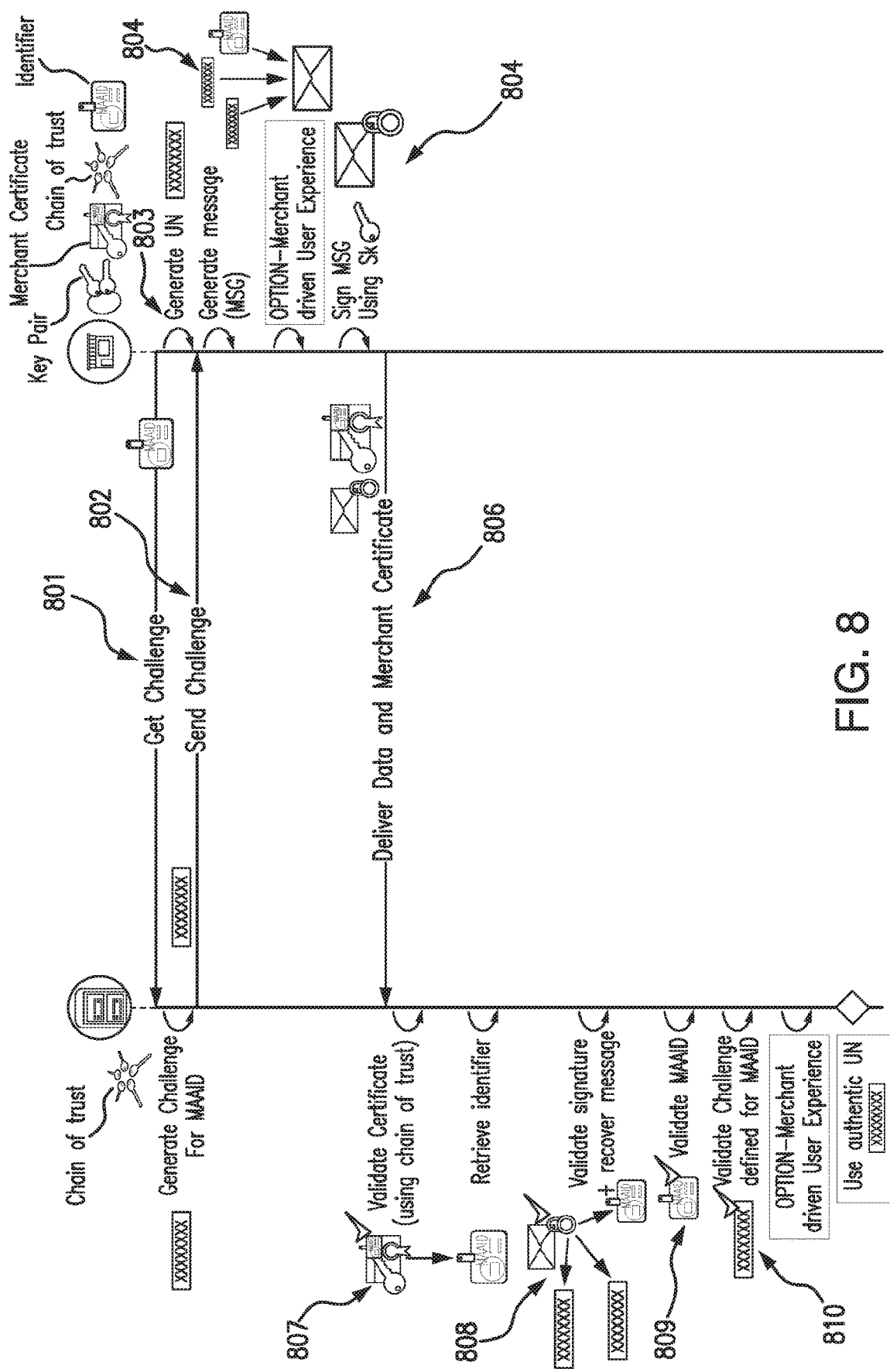
FIG. 8 illustrates a process used by a merchant and a wallet for delivery of an authenticated unpredictable number in embodiments of the disclosure.

FIG. 8 illustrates a process used by a merchant and a wallet for delivery of an authenticated unpredictable number in embodiments of the disclosure. An unpredictable number is used in certain existing cryptographic protocols for transactions compliant with EMV specifications. Use of an unpredictable number provided in an authenticated manner by a Genuine Merchant—bound to a MAAID—provides additional benefits, as discussed below.

The basic description of this process as used for a DSRP transaction is as follows:

1. The merchant generates an unpredictable number (UN) as part of a DSRP transaction.
2. The UN is sent to the wallet via an API between the merchant and the wallet.
3. The wallet contains a token, either within a hardware device within the same device or as software within the device or on a server.
4. The UN is used as part of the generation of the cryptogram(s).
5. The wallet returns the cryptogram(s) to the merchant.
6. The cryptogram(s) is(are) sent as part of a DSRP transaction for online authorization (using fields DE55 or DE48 as defined in EMV specifications).

An authenticated Unpredictable Number (UN) delivery cryptographically binds the delivery of the UN with the Mastercard Authenticated Accepter ID associated with the merchant. The authenticated Unpredictable Number (UN) delivery process is split into two parts:

A. The operations performed by the Merchant=Merchant Processing
B. The operations performed by the Wallet=Wallet Processing Authenticated UN Delivery—Merchant Processing The merchant has to deliver an authenticated Unpredictable Number (UN).

The steps of the process are as follows:

1. The merchant requests (801) a challenge providing the MAAID

2. The wallet receives the request and generates a challenge (4 bytes)
3. The wallet stores the challenge and the MAAID
4. The wallet returns (802) the challenge to the merchant
5. The merchant generates (803) the Unpredictable Number (UN)
6. The merchant uses their private key (delivered using the container or generated by the merchant as discussed above) to sign (805) the following message:
MSG:=Unpredictable Number|Challenge|Mastercard Authenticated Accepter ID
where | is the concatenation operator
7. The merchant can also use the message to carry information (804) about the user experience in the transaction as discussed further below.
8. There are several options to protect the message
  I. Sign the message with signature recovery
  Note that the small size of the message (24 bytes comprising a 4 bytes UN, a 4 bytes challenge and a 16-byte value for the MAAID) allows the information to fit inside the modulus.
  II. Sign the message
  III. Encrypt and sign the message
9. The merchant delivers (806) the following elements as part of the request sent to the Wallet to generate DSRP cryptogram(s):
  a. Data (one of the following options as set out in 8)
    I. Signature generated with message recovery
    II. Message and signature
    III. Encrypted message and signature
  b. Merchant certificate Authenticated UN Delivery—Wallet Processing The wallet has to authenticate the Unpredictable Number (UN). As a pre-requisite the wallet must have access to the transaction scheme CA public keys and the related chain of trust.

Figure 9:
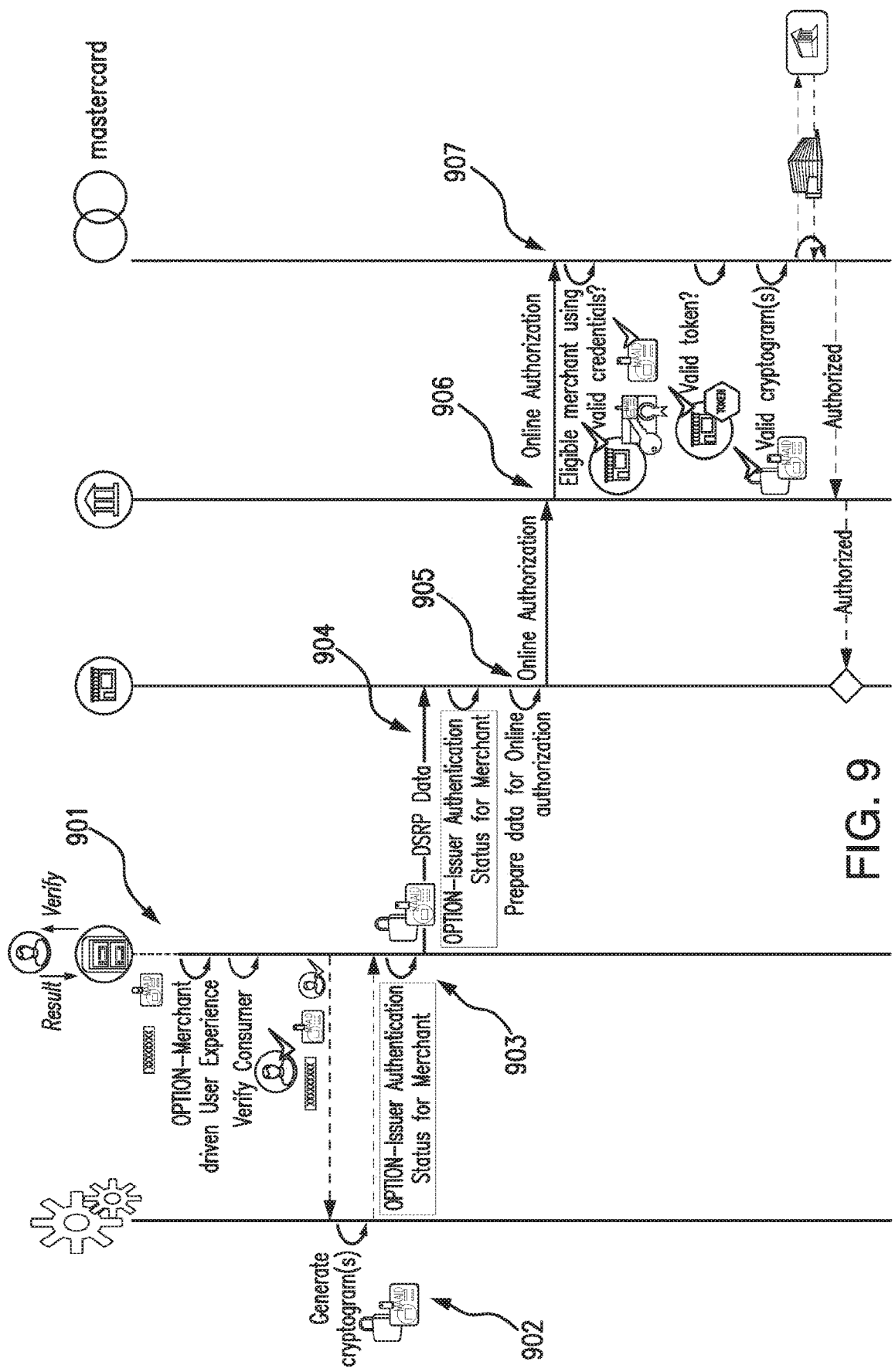
FIG. 9 illustrates channel locking in embodiments of the disclosure.

The steps of the process are as follows:
1. The wallet receives the following elements as part of the request sent by the merchant (or by any gateway used to trigger the DSRP process):
  a. Data (as discussed above)
    I. Signature generated with message recovery
    II. Message and signature
    III. Encrypted message and signature
  b. Merchant certificate
2. The wallet validates (807) the merchant certificate using the transaction scheme Public Key. Use of a Certificate Revocation List (CRL) or an Online Certificate Status Protocol (OCSP) is optional as any revoked merchant will be identified as part of the online authorization, and the related token and/or MAAID will be revoked or suspended
3. Upon successful validation of the merchant certificate the Wallet validates the signature and recovers (808) the original message constructed by the merchant:
MSG:=Unpredictable Number|Challenge|Mastercard Authenticated Accepter ID
Note that the use of signature with message recovery provides the assurance that the payment application has performed the validation of the signature generated by the merchant.
In this way the wallet can access the value of the Unpredictable Number (UN), the challenge and the MAAID.
The assurance is an implicit cryptographic proof that becomes explicit when the Unpredictable Number (UN) and the MAAID are used by the payment application (used by the wallet) to generate the application cryptogram(s) as discussed further below 4. The wallet checks (809) the value of the MAAID contained in the message against the MAAID defined in the merchant certificate.
5. Upon successful validation of the MAAID the wallet can check (810) the challenge.
6. Upon successful validation of the challenge (associated with the MAAID for the transaction) the wallet can use the authenticated Unpredictable Number (UN) and the MAAID for channel locking using an authentication model, as discussed further below.
7. The wallet can also retrieve information about the user experience proposed by the merchant to be applied as discussed further below.
8. The authenticated Unpredictable Number (UN) delivery process is completed with the following post-conditions:
  The delivery was done in the context of a challenge/response process (=freshness)
  The wallet has the authenticated Unpredictable Number (UN) generated by the merchant
  The wallet has the MAAID of the merchant FIG. 9 illustrates the use of embodiments of the disclosure to provide channel locking, by which the use of a token can be controlled so that it can only be used in a particular context—here, in a transaction with a specific merchant.

Again, an exemplary process will be described as used in DSRP transaction as follows:
1. The merchant generates an unpredictable number (UN) as part of a DSRP transaction
2. The UN is sent to the wallet and used as part of the application cryptogram(s) generation The UN is used to achieve the channel locking mechanism in connection with authentication and authorisation processes. The authentication model used in this process is as follows:
1. The transaction scheme is able to authenticate the merchant using the processes described above.
2. The wallet is able to authenticate the merchant using the signature process described above for authenticated Unpredictable Number delivery.
3. The authorization system is able to authenticate the wallet/payment Application (card authentication method—CAM) using cryptogram(s) validation in accordance with EMV specifications and processes.
4. The wallet is able to authenticate the consumer using a cardholder verification method (CVM) such as CDCVM (Consumer Device Cardholder Verification Method) or any equivalent method, again in accordance with EMV specifications and protocols.

The authorization system is able to check that consumer was verified by the wallet using cryptogram(s) validation when CDCVM was performed and that this was successful using Card Verification Results (CVR) information available from transaction information.

Using this approach, the authorization system is able to validate that the transaction was performed using an authenticated merchant authenticated by a wallet provider using a genuine token to deliver "Card" and "Consumer" authentication as the UN and the MAAID are part of the data used as input for cryptogram(s) generation.

This authentication model is used for channel locking. The full approach may be considered in three parts, each described in more detail below:
A. The operations performed by the wallet/payment application=Wallet/Payment Application Processing
B. The operations performed by the merchant=Merchant Processing C. The operations performed by the authorization system=Authorization System Processing Channel Locking—Wallet/Payment Application Processing The wallet uses the payment application to generate application cryptogram(s) in the context of a DSRP transaction. The payment application binds the application cryptogram(s) with the authenticated Unpredictable Number and the MAAID.

When performing a DSRP transaction the list of data used as input for application cryptogram(s) generation is set out in Table 1 below. Where terminology is not expressly defined in this document, it is described and defined in appropriate EMV specifications, as will be appreciated by the person skilled in the art.

TABLE 1

Input data for DSRP transaction

| Data object | Size (bytes) |
| --- | --- |
| Amount, Authorized (Numeric) | 6 |
| Amount, Other (Numeric) | 6 |
| Terminal Country Code | 2 |
| Terminal Verification Results (TVR) | 5 |
| Transaction Currency Code | 2 |
| Transaction Date | 3 |
| Transaction Type | 1 |
| Unpredictable Number (UN) | 4 |
| Application Interchange Profile (AIP) | 2 |
| Application Transaction Counter (ATC) | 2 |
| Card Verification Results (CVR) | 6 |

The steps of the process are as follows:

1. The wallet is responsible for the verification (901) of the consumer. Optionally, the merchant can play a role in the user experience of the wallet by adjusting the verification process according to merchant preferences delivered as part of the information carried in the merchant certificate as described above.

2. The wallet provides the outcome of the verification of the consumer to the payment application.

3. The payment application generates (902) the application cryptogram(s) using the standard list of data including the Unpredictable Number and the MAAID recovered as part of the authenticated Unpredictable Number delivery process.

a. The MAAID can be an additional information item in the data used as input for application cryptogram(s) generation using an updated CDOL (indicating a list of data to be delivered in the context of an EMV transaction) for a DSRP transaction or any equivalent method when a kernel or other command is used to generate the application cryptogram(s) in the context of a DSRP transaction.

b. The MAAID may be embedded in the data used as input for application cryptogram(s) generation as the value of one or several elements in the existing list of data used as input for AC (application cryptogram) generation.

4. The wallet can perform additional operations (903) described below in relation to Issuer Authentication Status prior to delivery of the response to the merchant 5. The wallet delivers (904) the DSRP data (including the application cryptogram(s)) back to the merchant. When the authenticated merchant uses tokens that are locked to the merchant, there is no need for the wallet to send back the MAAID to the merchant.

Channel Locking—Merchant Processing

The merchant is the interface between the wallet and the Acquiring system. The steps of the process performed by the merchant are as follows:

1. The merchant receives the DSRP data as part of the response sent by the wallet.

2. The merchant can perform additional operations described below in respect of Issuer Authentication prior to submitting the transaction for online authorization 3. The merchant prepares (905) the information for online authorization of the transaction including:

a. The Unpredictable Number generated by the merchant as part of the authenticated Unpredictable Number delivery process.

b. The content of the DSRP data received from the wallet.

4. The merchant delivers the transaction data to the Acquiring system for online authorization.

An authenticated merchant using tokens locked to the merchant does not need to provide the MAAID as part of the transaction data to be used for the online authorization message. The MAAID can be retrieved by the authorization system using the attributes of the token (as it is locked to the merchant).

An authenticated merchant not using tokens locked to the merchant must provide the MAAID as part of the transaction data to be used for the online authorization message Channel Locking—Authorization System Processing The authorization system is responsible for the validation of the DSRP transaction. The mechanism described here supports (but does not require) the concept of channel locking. The steps of the process performed by the authorization system are as follows:

1. The authorization system receives (906) the transaction data for validation.

2. The authorization system must retrieve the MAAID.

When using tokens locked to a merchant the identifier is retrieved from the information associated with the token used for the transaction. The MAAID may be defined as an attribute of the tokens delivered as part of digital enablement services the information is stored in the database of a token service provider.

When the tokens are not locked to a merchant, the MAAID is delivered by the merchant as part of the online authorization message.

3. The authorization system validates (907) that:

a. The MAAID is eligible for the service (for example, for channel locking)

b. The credentials of the merchant are still valid (for example, that the merchant certificate has not been revoked)

c. The token is valid and has not been suspended

4. The authorization system validates the application cryptogram(s) of the transaction using among other criteria the unpredictable number retrieved as part of the online authorization message and the MAAID retrieved for example from the token service provider database.

5. The successful validation of the cryptogram completes the process.

Figure 10:
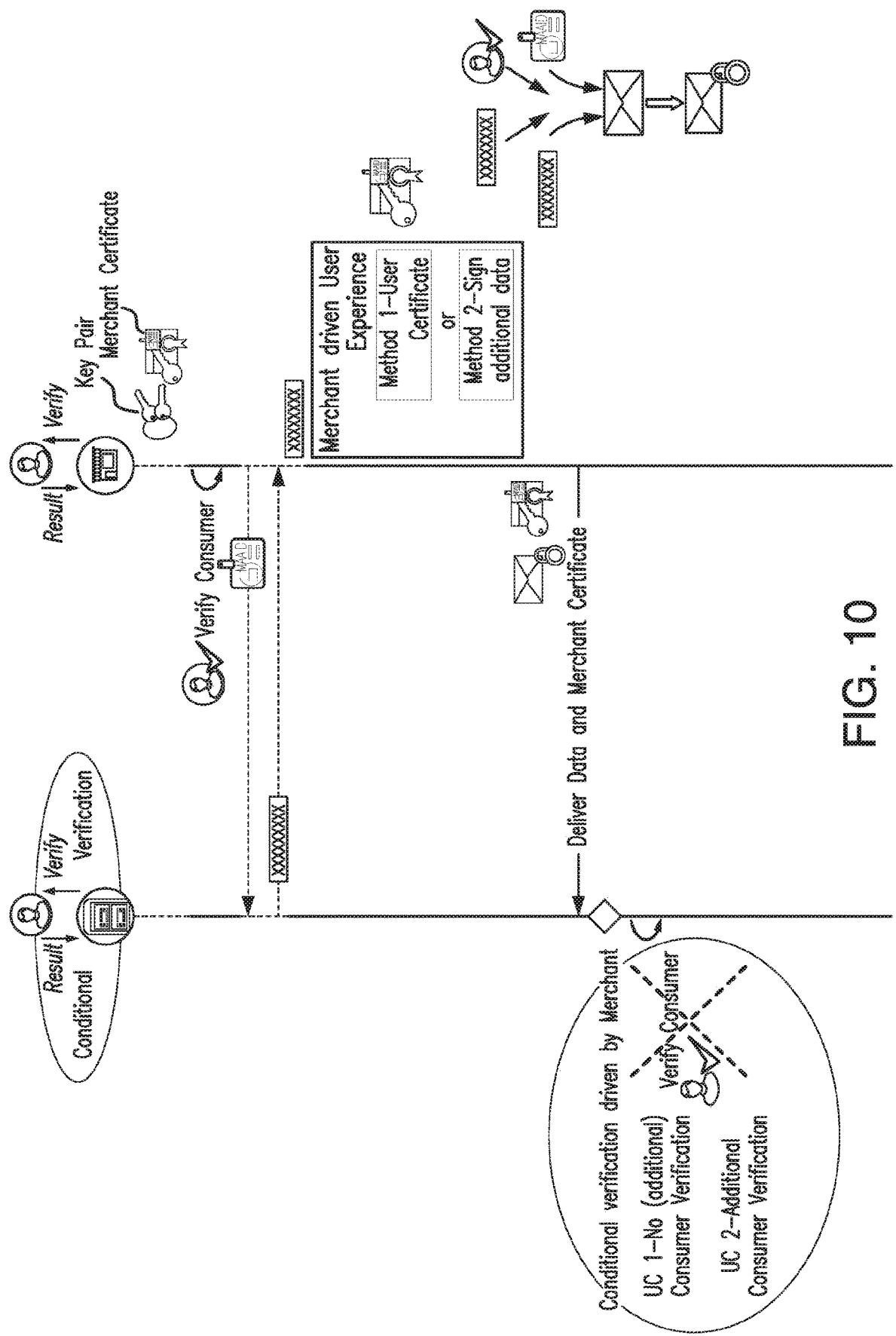
FIG. 10 illustrates options for additional functionality associated with transactions in embodiments of the disclosure.

FIG. 10 illustrates options for additional functionality associated with transactions in embodiments of the disclosure.

A merchant using a login process to let a user access the merchant website hosted on merchant server 12 to shop prior to the checkout and payment transaction process could obtain a merchant certificate which permits a liability shift, and which could allow the authentication of the user on the device to be bypassed (CDCVM bypass) as the authentication of the user has already been done on the merchant website in such a way that it may also be considered valid for the payment transaction.

As shown in FIG. 10, the merchant can drive the user experience of the wallet using several methods, for example:

The merchant certificate can contain policy information that is applicable for every transaction such as a systematic verification of the consumer performed by the merchant or a merchant policy that bypass any consumer verification on the wallet (for example when selling digital goods of low value).

The merchant can use a dynamic model using information contained in the merchant certificate and additional information about the consumer verification performed by the merchant. In such a case, the additional information can be delivered to the wallet as part of the process used to deliver the authenticated Unpredictable Number (UN) as defined above. The consumer verification performed by the merchant is signed and can be verified by the wallet prior to its use to drive the user experience at the wallet.

Figure 11:
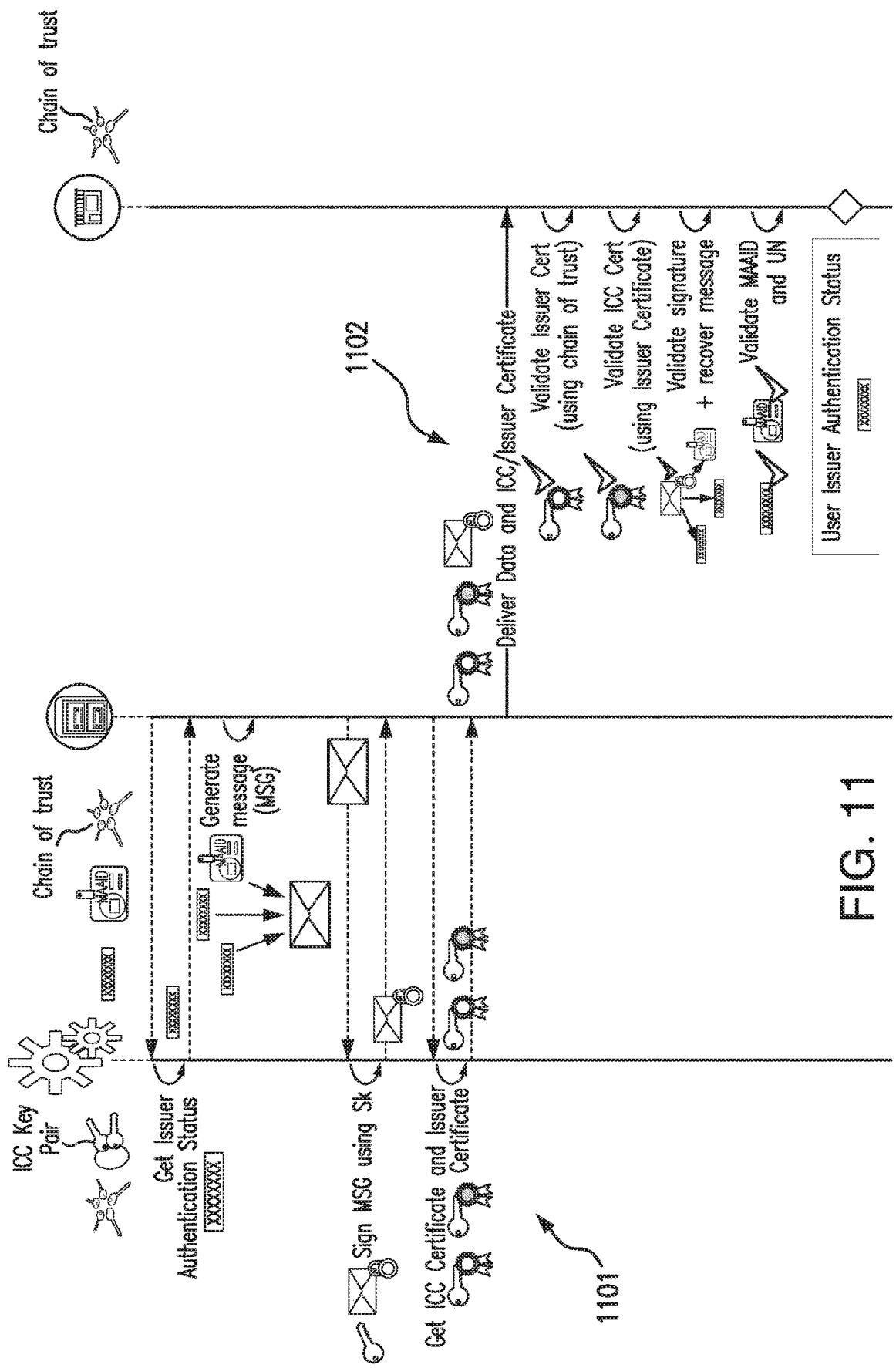
FIG. 11 illustrates a process for providing issuer authentication status in embodiments of the disclosure.

FIG. 11 illustrates a process for providing issuer authentication status in embodiments of the disclosure. This approach enables enhancements to support issuer authenticated Digital Secure Remote Payment (DSRP) transactions. In the context of tokenised transactions (for example, for DSRP transactions originated using MDES tokens), the transaction scheme may use an existing bit within the transaction data and use it to carry additional information. One possible solution is to use a, reserved bit within the Application Interchange Profile (AIP) data object to identify whether a token is capable of issuer authentication. In the context of DSRP transactions, this may be implemented as follows:

AIP byte 2, bit 6, value 1 can indicate that the token is capable of Issuer-Authenticated DSRP transactions AIP byte 2, bit 6, value 0 can indicate that the token is not capable of Issuer-Authenticated DSRP transactions This AIP value is a static value that is part of the card profile associated with the token.

Using existing transaction flows, a merchant looking to know whether the DSRP transaction is Issuer-Authenticated or not would have to retrieve the value of the AIP considering that the process is dependent of the method used to deliver DSRP data to the merchant using either DE55 or DE48 (Universal Cardholder Authentication Field—UCAF). Specific UCAF formats may be defined by transaction scheme providers. Once the AIP value is retrieved by the merchant, the latter must parse the value (2 bytes) in order to retrieve the AIP byte 2, bit 6.

Using embodiments of the disclosure, Issuer Authentication Status can be determined by the wallet/payment application based on token information (using the Issuer-Authenticated capable flag defined using AIP byte 2, bit 6). An Issuer Authenticated transaction means that the Issuer has participated or had the opportunity to verify the cardholder. The Issuer Authentication Status is used to report that the consumer is the cardholder.

The management of the Issuer Authentication Status is split into two parts:

A. The operations performed (1101) by the wallet/payment Application=Wallet/Payment Application Processing. These comprise using the card and the chain of trust to obtain Issuer Authentication Status, and to generate and sign an appropriate message, with the message and card and issuer certificates provided for delivery to the merchant.

B. The operations performed (1102) by the merchant=Merchant Processing. These comprise receiving the information delivered by the wallet and payment application, validating the issuer and the card certificates using the chain of trust, validating signatures and recovering message data including Issuer Authentication Status.

Note that the introduction of the Issuer Authentication Status must be seen as an additional feature compared to the use of the AIP byte 2, bit 6. When using this solution the merchant does not need to parse the payment data in order to retrieve the Issuer Authentication Status.

As the person skilled in the art will appreciate, modifications and variations to the above embodiments may be provided, and further embodiments may be developed, without departing from the spirit and scope of the disclosure. Reference to standards and proprietary technologies are provided for the purpose of describing effective implementations, and do not limit the scope of the disclosure.

The invention claimed is:

1. A cryptographic method of performing a tokenised transaction between a payment offering party and a payment accepting party mediated by a transaction scheme provider, the method comprising:
receiving, from the payment accepting party, transaction seed data and a merchant certificate that is registered with the transaction scheme provider and indicates a customer verification method;
identifying the customer verification method indicated by the merchant certificate;
performing the customer verification method identified from the merchant certificate;
in response to successful performance of the customer verification method, generating a cryptogram for the tokenised transaction using the transaction seed data; and
providing the cryptogram to the payment accepting party for transmission to the transaction scheme provider for authorisation of the tokenised transaction.

2. The method of claim 1, wherein the transaction seed data comprises a key associated with the merchant certificate.

3. The method of claim 1, wherein the transaction seed data comprises an unpredictable number.

4. The method of claim 1, further comprising providing issuer authentication status information to the payment accepting party to indicate whether a token for the tokenised transaction has been authenticated by an issuer associated with an account of the payment offering party.

5. The method of claim 4, wherein the providing the issuer authentication status information is provided in a message rather than in transaction data.

6. The method of claim 1, further comprising locking a token associated with the tokenised transaction for use only for a transaction with the payment accepting party.

7. The method of claim 6, wherein the transaction scheme provider determines whether the token is locked for use only with a transaction with the payment accepting party and uses this determination in providing transaction authorisation.

8. A user computing device, comprising a processor, a memory, and instructions stored on the memory that when executed by the processor direct the processor to at least:

receive, from a payment accepting party, transaction seed data and a merchant certificate that is registered with a transaction scheme provider and indicates a customer verification method;

identify the customer verification method indicated by the merchant certificate;

perform the customer verification method identified from the merchant certificate;

in response to successful performance of the customer verification method, generate a cryptogram for a tokenised transaction using the transaction seed data; and provide the cryptogram to the payment accepting party for transmission to the transaction scheme provider for authorisation of the tokenised transaction.

9. The user computing device of claim 8, wherein the transaction seed data comprises a key associated with the merchant certificate.

10. The user computing device of claim 8, wherein the transaction seed data comprises an unpredictable number.

11. The user computing device of claim 8, wherein the instructions further direct the processor to provide issuer authentication status information to the payment accepting party to indicate whether a token for the tokenised transaction has been authenticated by an issuer associated with an account of a payment offering party.

12. The user computing device of claim 11, wherein the providing the issuer authentication status information is provided in a message rather than in transaction data.

13. The user computing device of claim 8, further comprising locking a token associated with the tokenised transaction for use only for a transaction with the payment accepting party.

* * * * *